United States Patent
Landsmann et al.

(10) Patent No.: US 9,752,518 B2
(45) Date of Patent: Sep. 5, 2017

(54) METHOD FOR THE LOAD-DEPENDENT OPENING AND CLOSING OF A BLOW-OFF VALVE FLAP OF AN INTERNAL COMBUSTION ENGINE WITH A TURBOCHARGER

(71) Applicant: GM GLOBAL TECHNOLOGY OPERATIONS LLC, Detroit, MI (US)

(72) Inventors: Gerhard Landsmann, Roedern (DE); Baris Camurtay, Munich (DE); Joerg Bernards, Katzenelnbogen (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/541,990

(22) Filed: Nov. 14, 2014

(65) Prior Publication Data
US 2015/0128588 A1   May 14, 2015

(30) Foreign Application Priority Data
Nov. 14, 2013 (DE) .......................... 10 2013 019 150

(51) Int. Cl.
*F02D 41/00* (2006.01)
*F02D 41/18* (2006.01)
(Continued)

(52) U.S. Cl.
CPC .......... *F02D 41/0007* (2013.01); *F02B 37/18* (2013.01); *F02D 41/18* (2013.01);
(Continued)

(58) Field of Classification Search
CPC ...... F02B 37/18; F02B 37/183; F02B 37/186; F02D 41/007
(Continued)

(56) References Cited

U.S. PATENT DOCUMENTS 4,477,875 A * 10/1984 Suzuki ................. F02B 37/186
                                                    60/602
5,950,432 A    9/1999 Zimmer et al.
(Continued)

FOREIGN PATENT DOCUMENTS

GB      2502805 A      12/2013
JP   2014169648 A  *   9/2014

OTHER PUBLICATIONS

Intellectual Property Office of Germany, Search Report dated Mar. 24, 2014 for DE 10 2013 019 150.5.

*Primary Examiner* — Phutthiwat Wongwian
*Assistant Examiner* — Jessica Kebea
(74) *Attorney, Agent, or Firm* — Lorenz & Kopf LLP (57) ABSTRACT

A method for the load-dependent opening and closing of a blow-off valve flap of an internal combustion engine with a turbocharger is provided, in which by at least one detector on an internal combustion engine inlet side, at least one air pressure value, one air mass flow value and/or an opening position of a valve of the suction pipe are detected and transmitted to a control device. By the control device from the received values a current load of the internal combustion engine is determined, and by the control device based on the determined current load of the internal combustion engine and/or of the turbocharger, control inputs for an actuator of the blow-off valve flap are generated and transmitted to the actuator. The blow-off valve flap is completely opened, partially opened, minimally opened or closed and held in the respective position by the actuator dependent on the current load.

14 Claims, 7 Drawing Sheets

(51) Int. Cl.
*F02D 41/14* (2006.01)
*F02B 37/18* (2006.01)

(52) U.S. Cl.
CPC ........... *F02D 2041/1433* (2013.01); *F02D 2200/0406* (2013.01); *F02D 2200/604* (2013.01); *F02D 2200/606* (2013.01); *Y02T 10/144* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 6,161,384 A * | 12/2000 | Reinbold | ................ | F02B 37/12 60/602 |
| 6,626,164 B2 * | 9/2003 | Hitomi | ................... | F01L 1/34 123/568.14 |
| 7,051,527 B2 | 5/2006 | Schmid et al. | | |
| 7,621,127 B2 * | 11/2009 | Robinson | ............. | F02D 41/0007 180/197 |
| 7,775,043 B2 * | 8/2010 | Funke | .................... | F02D 23/00 60/602 |
| 8,333,072 B2 * | 12/2012 | Robinson | ............... | F02B 29/04 477/32 |
| 8,468,821 B2 * | 6/2013 | Liu | ....................... | F02B 37/004 60/600 |
| 8,959,910 B2 * | 2/2015 | Rollinger | ............... | F02D 41/22 60/602 |
| 9,175,597 B2 * | 11/2015 | Katsumata | .......... | F02D 41/0007 |
| 9,267,426 B2 * | 2/2016 | Makino | ................ | F02B 37/127 |
| 2008/0077304 A1 * | 3/2008 | Suzuki | ................ | F02D 13/0261 701/102 |
| 2010/0263641 A1 * | 10/2010 | Hagelstein | .......... | F02B 29/0437 123/568.12 |
| 2011/0113773 A1 * | 5/2011 | Liu | ....................... | F02B 37/004 60/602 |
| 2013/0282256 A1 * | 10/2013 | Watanuki | ................ | F02D 23/02 701/102 |
| 2013/0333663 A1 * | 12/2013 | Chen | ...................... | F02D 17/02 123/334 |

* cited by examiner

METHOD FOR THE LOAD-DEPENDENT OPENING AND CLOSING OF A BLOW-OFF VALVE FLAP OF AN INTERNAL COMBUSTION ENGINE WITH A TURBOCHARGER

CROSS REFERENCE TO RELATED APPLICATION

This application claims priority to German Patent Application No. 102013019150.5, filed on Nov. 14, 2013, which is incorporated herein by reference in its entirety.

TECHNICAL FIELD

The technical field relates to a method and a device for the fuel consumption reduction of an internal combustion engine with a turbocharger, in particular for a motor vehicle.

BACKGROUND

In internal combustion engines with a turbocharger there is a conflict of objectives between operating the internal combustion engine with as low as possible a fuel consumption and operating the motor vehicle with sound driving characteristics, such as for example quick reaction when actuating the accelerator. As low as possible a fuel consumption can be achieved when a blow-off valve is opened wide while the best driving characteristics are achieved with the blow-off valve closed.

In addition, other objects, desirable features and characteristics will become apparent from the subsequent summary and detailed description, and the appended claims, taken in conjunction with the accompanying drawings and this background.

SUMMARY

According to the various teachings of the present disclosure, provided is a method for an internal combustion engine with a turbocharger in which sound driving characteristics with low fuel consumption and reduced pollutant emission can be achieved.

One of various aspects of the present disclosure relates to methods for the load-dependent opening and closing of a blow-off valve flap of an internal combustion engine with a turbocharger, in which by at least one detector on an inlet side of the internal combustion engine at least one air pressure value, one air mass flow value and/or one opening position of a valve of an suction pipe are detected and transmitted to a control device, by the control device a current load of the internal combustion engine is determined from the transmitted values, by the control device based on the determined current load a control input for an actuator of the blow-off valve flap is generated and transmitted to the actuator, wherein the control input is designed to completely open, partially open, minimally open or close the blow-off valve and to keep it in the respective position.

Based on the calculated current load of the internal combustion engine, or of the different operating states of the internal combustion engine characterized by this and detected by the detectors, the control device generates control inputs for the actuator of the blow-off valve flap by which the blow-off valve flap, corresponding to the calculated load, is then completely opened, partially opened, minimally opened or closed and held in the respective position. In one example, the method is suited for optimizing a degree of opening of the blow-off valve flap in a part load range of the internal combustion engine by seeking a compromise between internal combustion engine dynamics and fuel consumption.

Accordingly, a first detector can for example detect an air mass flow to a compressor of the turbocharger and a signal representing the detected air mass flow can be transmitted by the first detector to the control device. The change of the air mass flow has surprisingly proved to be a suitable parameter in order to achieve optimal positioning of the blow-off valve flap.

By a further detector, air pressure in the air mass flow to the compressor can be detected for example and a signal representing the detected air mass flow can be transmitted by the second detector to the control device. The detected air mass flow can likewise be suitable directly or as additional parameter to achieve optimal positioning of the blow-off valve flap.

By a third detector, a pressure can be detected for example at the outlet of the compressor and a signal representing the detected compressor air pressure can be transmitted by the third detector to the control device. The detected compressor air pressure can be suitable directly or as additional parameter to further optimize the positioning of the blow-off valve flap.

By a fourth detector, the position for example of a valve which controls the flow of the compressed air into an inlet valve upstream of a combustion chamber of a cylinder, can be detected and a signal representing the detected valve position can be transmitted by the fourth detector to the control device. The detected valve position can likewise be suitable directly or as additional parameter to further optimize the positioning of the blow-off valve flap.

From the received signal of the at least one detector, the current load of the internal combustion engine can be calculated by means of the control device. For the calculation, the control device can use a calculation algorithm or even multiple calculation algorithms. By means of the calculation, a control input for the blow-off valve flap is generated and transmitted to the actuator or the actuating drive for the blow-off valve flap.

Before the activation of the actuating drive through the control device the blow-off valve flap, by means of the actuating drive, is moved out of its current position into a position in which it is completely opened, completely closed or partially or minimally opened. In the adjusted position, the blow-off valve flap is held until a further control input transmitted by the control device activates the actuating drive for the blow-off valve flap once again. Thus, adaptation of the position of the blow-off valve flap to the current operating state of the internal combustion engine virtually without delay can be achieved and an optimal compromise preset by the control device or determined by the driver between fuel consumption and as agile as possible a driving style can be continuously maintained.

It is to be understood that the control device, which uses a software algorithm, can form a control in one aspect and an automatic control or part of a controlled system in another. Accordingly, in the last-mentioned case, an actual position can be compared with a set point position of the blow-off valve flap by means of the software algorithm of the control device acting as automatic controller and the control input formed based on the difference of the degree of opening obtained from this. The parameter detected by the at least one detector can be supplied to the automatic controller in the automatic control circuit as control variable.

In various aspects, a change of the air pressure along the compressor and/or a change of the rotational speed of the turbine of the compressor can be detected by means of the software algorithm of the control device and based on this the control input formed.

An optimal set point position can be adjusted in a controlled manner when an actual position of the blow-off valve flap is detected by a detector and passed on to the control device. The control device can compare the corresponding actual value with the current pressure ratio at the compressor and/or a rotational speed of the compressor/the turbine and from the comparison calculate an optimal flap position of the blow-off valve flap and send control inputs to the blow-off valve actuator in order to change the degree of opening of the blow-off valve from the actual to the set point degree of opening. The advantage resulting from this is that for example in a sports mode of the internal combustion engine selected by the driver of the motor vehicle the blow-off valve flap in the part load range can for example be completely closed by means of the control device so that the entire air mass flow coming from the combustion chamber is directed through the turbine, as a result of which the turbine exhibits high performance and short reaction times during a load change. Accordingly, in a selected fuel economy mode of the internal combustion engine, the blow-off valve flap can for example in a part load range of the internal combustion engine be only partly, for example half, or even completely opened so that a part of the air mass flow coming from the combustion chamber is directed through the blow-off valve past the turbine, as a result of which the turbine has a lower performance without however excessively extending the reaction times of the internal combustion engine in the part load range.

In an intermediate mode or normal mode of the internal combustion engine in the part load range the blow-off valve flap can assume any opening positions located between the positions completely or wide opened and completely closed or minimally opened.

In the case of a value of the inlet pressure in the combustion chamber which is greater than zero but smaller than a preset limit value, the blow-off valve flap can be moved by the actuating drive, in one example, independently of the degree of opening of a throttle valve, into a minimally opened position and held there. In the minimally opened position a degree of opening of the blow-off valve flap advantageously is just of such a dimension that the pumping losses in the compressor caused through the degree of opening are minimal. In the minimally opened position, the blow-off valve flap can be opened for example about 10%, about 20%, about 30% or any other value that can be determined through calculation and tests.

With a value of the inlet pressure in the part load range of the internal combustion engine that is greater than the preset limit value and smaller than the ambient pressure, the blow-off valve flap can be moved by the actuating drive into a partially opened position and held there. In the partially opened position, a degree of opening of the blow-off valve flap is of such a dimension that a rotational speed of the turbine remains substantially constant. In the partially opened position the blow-off valve flap can for example be opened about 40%, about 50%, about 60% or another value that can be determined through calculation and/or tests.

The advantage resulting from this is a continuously adjustable band width between sportive driving with minimally opened position of the blow-off valve flap and fuel-saving driving with position correspondingly opened further.

The preset limit value is a limit value which for example is dependent on a load of the internal combustion engine and/or an air mass flow of the fresh air flowing into the combustion chamber. The limit value is determined at the factory for the engine for any operating state and for example stored as a limit value curve in a storage unit in the control device.

In the case of a value of the inlet pressure in the combustion chamber which is greater than the ambient pressure, the blow-off valve flap can be completely closed.

This means that the optimized opening position of the blow-off valve flap can be controlled through a control device of the opening position and/or a control device of a ratio of the pressure upstream of and after the compressor and/or a control device of the rotational speed of the turbine/of the compressor.

One of various aspects of the present disclosure relates to a device for checking the setting and/or adjusting of a degree of opening of a blow-off valve flap, the device comprising: an internal combustion engine with a turbocharger; a blow-off valve, arranged between an exhaust line of the internal combustion engine and a discharge of a turbine of the turbocharger, with a blow-off valve actuator for setting a degree of opening of the blow-off valve flap; a detector detecting the degree of opening of the blow-off valve flap; and a control device for setting a load-dependent degree of opening of the blow-off valve flap.

With an actuating element, for example a pressure or rotary type regulator, a blow-off valve flap opening and closing model can be selected in the part load range of the internal combustion engine, i.e. with a partially opened throttle valve, with which the blow-off valve flap can be optimally opened or closed. For example, three modes can be offered for selection which makes it possible for the driver to select in the part load range of the internal combustion engine between a sportive driving style, a consumption-optimized driving style and a third driving style, which makes possible a compromise between sportiveness and consumption optimization.

By way of the mode, the degree of opening of the blow-off valve flap can be selected according to the chosen driving style. Thus, the blow-off valve flap can remain completely closed for example in the sports mode in order to allow a dynamic driving style.

In the economy mode, the blow-off valve flap, in the part load range of the engine, can be opened for example about 50% or more or less in order to allow the driver an operating state that is optimized with regard to fuel consumption.

In a third mode, which can be described as normal mode, a degree of opening of the blow-off valve flap can be controlled so that a compromise between the dynamic driving style in the sports mode and the consumption-saving driving style in the economy mode is achieved.

Since the described method in the part mode range of the internal combustion engine requires opening and closing of the blow-off valve flap independently of a charge pressure of the internal combustion engine, the actuator, in one example, is an electrically or vacuum-controlled actuating drive for the blow-off valve flap, with which the blow-off valve flap can be opened and closed as far as desired independently of the position of the throttle valve and of the charge pressure and held in any degree of opening.

In one example, the detector is directly connected to the blow-off valve flap and continuously detects a current opening angle of the blow-off valve flap.

An advantage of the minimally opened flap is that from this position the time to the complete closing, which can be initiated through a sudden flooring of the accelerator by the driver, is shorter than if the blow-off valve flap were completely opened. In order to be able to adapt the opening position of the blow-off valve flap in the part load range of the internal combustion engine in the selected driving mode to a current load, the device can comprise further detectors which detect current data in an internal combustion engine ventilation system, and pass these on to a control device.

A further detector can for example detect the pressure and/or the air mass flow fed to the compressor respectively sucked in by the compressor. Pressure and air mass flow change when for example a rotational speed of the compressor changes. Provided that an air filter is present in the compressor feed, the pressure and the air mass flow are detected downstream of filter. Pressure and air mass flow can otherwise be detected also by two separate detectors.

A further detector can for example detect the pressure in a line downstream of compressor, so that by comparing the pressure in the air mass flow upstream of and downstream of compressor a pumping performance of the compressor can be determined.

A further detector can for example measure the pressure in an air provision chamber for the combustion air upstream the inlet into the combustion chamber. The air supply into the combustion engine can be controlled through a controlled valve.

The device comprises a control device with at least one preset flap opening and closing model. This model is stored in one example, already at the factory in for example a storage element of the control device. In the control device, multiple preset flap opening and closing models for the part load range of the internal combustion engine, for example a model for dynamic driving, a model for environmentally friendly driving, a model for optimized normal operation of the vehicle, etc. can be present, from which the driver can select a model with the help of the actuating element, for example the sports mode for freeway driving.

It is also possible to equip a vehicle with a control device which permits operation of the vehicle only in normal mode, i.e. an operating mode which in the part load range of the internal combustion engine is optimized by dynamic and consumption, which makes possible relatively dynamic driving with relatively low energy consumption.

One of various aspects of the present disclosure relates to a computer program for carrying out the method described above.

The computer can have a digital microprocessor unit (CPU) which is data connected to a storage system and a bus system, a working memory (RAM) and a storage means. The CPU is designed to execute commands which are embodied as a program stored in a storage system, detect input signals from the data bus and emit output signals to the data bus. The storage system can comprise various storage media such as optical, magnetic, solid-state and other non-volatile media, on which a suitable computer program for carrying out the method and the advantageous configurations is stored. The program can be of such a type that it embodies or is capable of carrying out the methods described here, so that the CPU can carry out the steps of such methods and thus control the opening and closing of the blow-off valve of an internal combustion engine of a motor vehicle with turbocharger in a part load range of the internal combustion engine by means of a preset flap opening and closing model.

To carry out a method, a computer program is suitable which comprises program code means in order to carry out all steps of the method when the program is executed on a computer.

The computer program can be downloaded and used in already existing control units with simple means in order to control the method for opening and closing the blow-off valve flap with the help of the preset flap opening and closing model of an internal combustion engine of the motor vehicle with turbocharger in a part load range of the internal combustion engine.

The computer program product can also be integrated in control units as retrofit option.

One of various aspects of the present disclosure relates to a computer program product with program code means which are stored on a computer-readable data carrier in order to be able to carry out the method described above when the program code means are executed on a computer.

The computer program product can also be integrated in control units as retrofit option.

In one of various aspects, a device is provided for the load-dependent opening and closing of a blow-off valve flap of an internal combustion engine with a turbocharger, the device comprising on an inlet side of the internal combustion engine, a detector for detecting at least one air pressure value, an air mass flow value and/or an opening position of a valve of an suction pipe and for transmitting to a control device, a control device for determining a current load of the internal combustion engine from the transmitted values, for generating a control input for an actuator for the blow-off valve flap and for transmitting the control input to the actuator, wherein the control input is designed to completely open, partially open, minimally open or close the blow-off valve flap and to hold it in the respective position.

A control device of the device can, in one of various aspects, comprise a software algorithm for comparing an actual position with a set point position of the blow-off valve flap and for forming a control input based thereon.

The control device of the device can, in one of various aspects, comprise a software algorithm for detecting a change of the air pressure along the compressor and for forming a control input based thereon.

The control device of the device can, in one of various aspects, comprise a software algorithm for detecting a change of the rotational speed of the turbine of the compressor and for forming a control input based thereon.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

In the figures, components which are the same or have the same functional effect are marked with the same reference characters.

Figure 1:
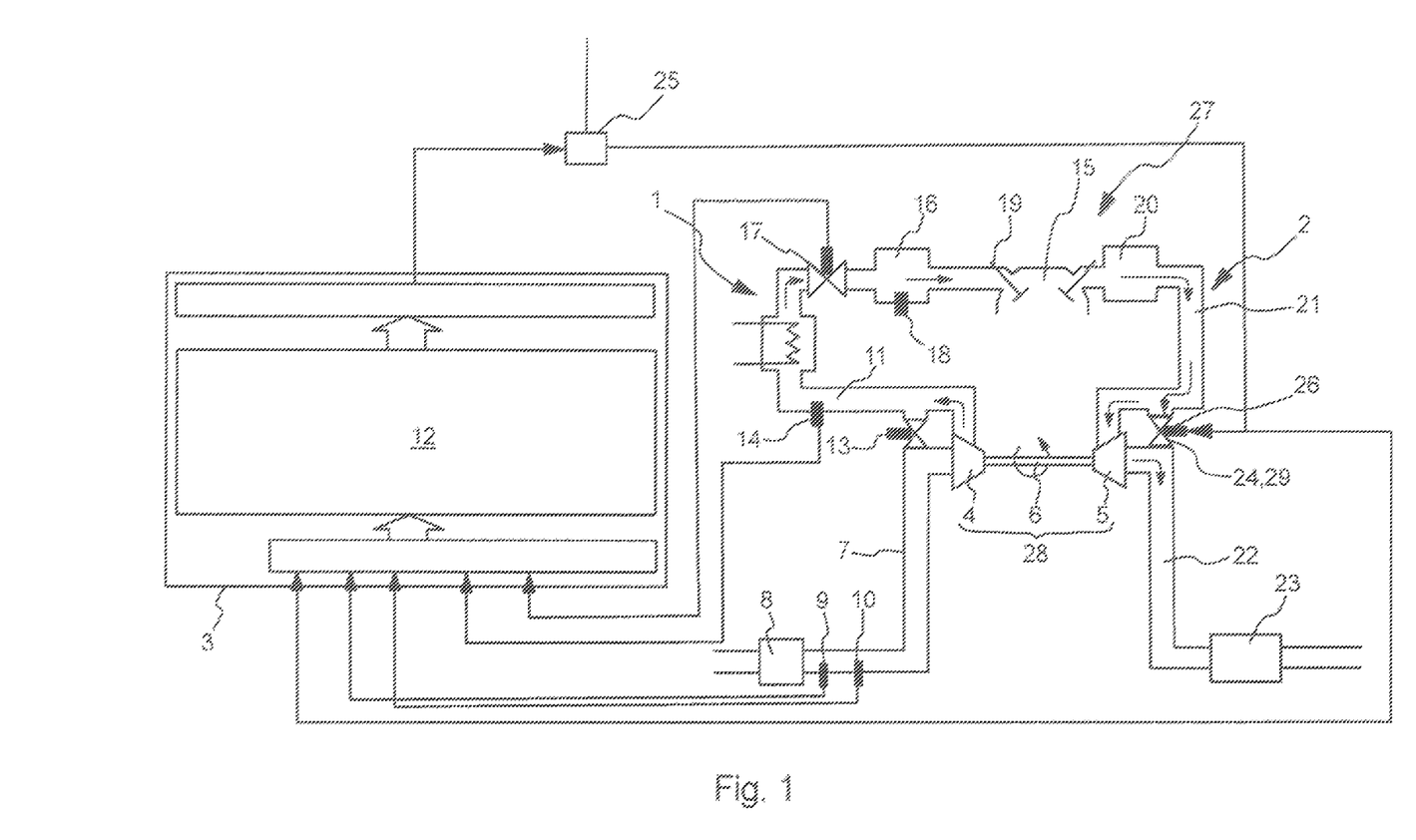
FIG. 1 is a sketch of a control system for an internal combustion engine with turbochargers.

In FIG. 1, a control system for an internal combustion engine 27 is sketched, with which a degree of opening of a blow-off valve flap 24, also waste gate, can be controlled in a part load range of the internal combustion engine 27.

The control system comprises an inlet side 1, an outlet side 2 and a control device 3. By means of the control device a software algorithm 12 can be executed.

The inlet side 1 comprises a compressor 4, an internal combustion engine ventilation system 2 and a turbine 5. The compressor 4 is connected to the turbine 5 in a rotationally fixed manner by means of an axle 6. Compressor 4 and turbine 5 jointly form a turbocharger 28 for an internal combustion engine 27 of a motor vehicle.

The inlet side 1 furthermore comprises a supply line 7, through which the compressor 4 can suck in air. Here, the air is initially sucked through an air filter 8. Behind the air filter 8 a detector 9 is located, which detects an air mass flow flowing in the supply line 7 and a further detector 10, which detects a pressure of the air mass flow in the supply line 7.

The detectors 9 and 10 are connected to the control device 3 and send the respective detected air mass flow and pressure values respectively to the control device 3 via lines or a local radio network.

From the compressor 4, a compressed air mass flow is conducted in a line 11 to a combustion chamber 15 of the internal combustion engine 27. The supply line 7 and the line 11 are connected via a connecting line to a valve 13, through which a part of the air mass flow flowing through the line 7 to the compressor 4 can be conducted past the compressor 4, which results in a pressure reduction in the line 11, which can be detected by a detector 14. The detected pressure drop in the line 11 leads to a rapid closing of the blow-off valve 24.

Accordingly, the line 11 comprises the detector 14 in order to detect a pressure in the line 11 downstream of compressor 4 and to send the detected pressure value to the control device 3. The line 11 runs through a cooler to a control valve 17, which controls an inflow of the air in the combustion chamber 15 as a function of a requested load of the internal combustion engine 27 and reports a current degree of opening to the control device 3.

The control valve 17 controls the air mass flow in a provision chamber 16 with suction pipe that is not shown, where by a further detector 18 a pressure of the air that is provided for supply into the combustion chamber 15 is measured.

By way of an inlet valve 19, the air enriched with fuel from the provision chamber 16 is admitted into the combustion chamber 15, combusted in the combustion chamber 15 and directed towards the exhaust side 2 through an exhaust valve 20.

The exhaust side 2 comprises a line 21, which directs the exhaust gas generated in the combustion chamber 15 to the turbine 5, and a discharge line 22, which discharges the air downstream of turbine 5 to a further unit or, as shown in FIG. 1, to the environment via a catalytic converter 23.

The discharge line 21 comprises a blow-off valve 22, which is connected to a blow-off valve actuator 25, which receives control inputs from the control device 3. The blow-off valve actuator 25 can open and close a blow-off valve flap 24 of the blow-off valve 29 and hold it in a preset opening position. The blow-off valve actuator 25 is an actuator with an electric servomotor or an actuator that is operated via a vacuum pump.

Through the blow-off valve 29, a part of the exhaust gas can be directed out of the combustion chamber 15 past the turbine 5 so that the air mass flow directed to the turbine 5 is reduced and a rotational speed of the turbine 5 and thus of the compressor 4 falls.

The control device 3 can receive the signals of the detectors 9, 10, 14 and receive, possibly filter the degree of opening of the throttle valve or control valve 17 and calculate a current load of the internal combustion engine 27 by means of a preset algorithm. In the control device 3, an optimal position for the blow-off valve flap 24 can be calculated from this data and control inputs for the blow-off valve actuator 25 are generated and sent to the blow-off valve actuator 25.

Depending on the currently calculated load, the blow-off valve flap 24 can be completely opened, partially opened, minimally opened or completely opened.

In order to be able to determine a current opening angle or degree of opening of the blow-off valve flap 24 at any time, a detector 26 which is connected to the control device 3 is arranged on or near the blow-off valve flap 24.

Figure 2:
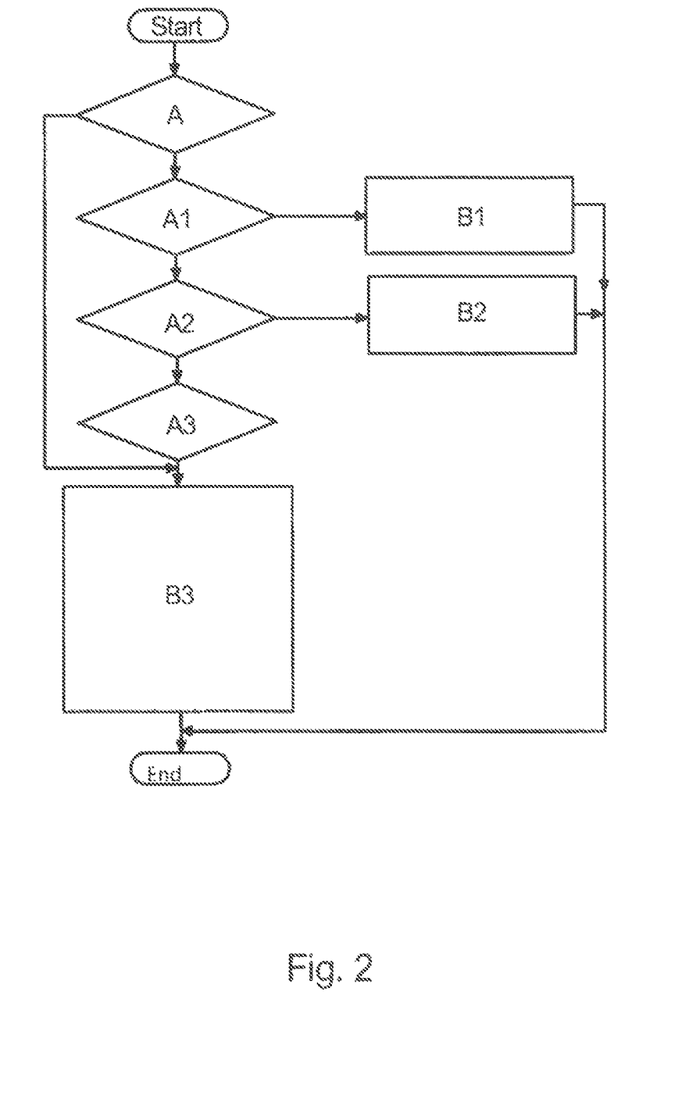
FIG. 2 is a flow sketch of a method for controlling a blow-off valve flap position of an internal combustion engine with turbocharger.

In FIG. 2, a method sequence of a method is sketched with which a degree of opening of a blow-off valve flap 26 of an internal combustion engine exhaust side 2 of an internal combustion engine 27 with a turbocharger 28 can be controlled.

For starting the method, a motor vehicle driver can set a mode on a selector knob A, in which the motor vehicle is to be operated. Accordingly, he can select a sports mode A1, a fuel economy mode A2 or a normal mode A3 with the selector knob.

In the sports mode A1, the blow-off valve flap 26 is always completely closed in the part load of the internal combustion engine 27 (state B1), so that a maximum air mass flow coming from the combustion chamber 15 always flows through the turbine 5. Because of this, the rotational speed of the turbine 5 can be rapidly changed during a load change, in one example, rapidly accelerated which results in an optimal acceleration of the motor vehicle however with relatively high fuel consumption.

If the fuel economy mode A2 is selected, the blow-off valve flap 24 is partially opened in the part mode of the internal combustion engine 27 (state B2), for example about 50%, as a result of which the air mass flow coming from the combustion chamber 15 is partly conducted past the turbine 5. Because of this, the rotational speed of the turbine 5 is reduced which results in a still adequate dynamics of the internal combustion engine 27 during a load change, for example, during acceleration.

If the normal mode A3 is selected, a degree of opening of the blow-off valve flap 24 is determined by the control device (state B3). Depending on the current load of the internal combustion engine 27, the blow-off valve flap 26 can be closed by a blow-off valve actuator 25, minimally opened, partially opened or completely opened, wherein at least in a part load range of the internal combustion engine 27 the blow-off valve flap 26 in the normal mode is either minimally opened or partially opened, as a result of which a compromise between driving comfort, for example acceleration time, and fuel consumption is achieved, which altogether results in that the internal combustion engine 27 consumes less fuel and emits less pollutants without the driving comfort decisively deteriorating because of this.

By means of a software algorithm of the control device 3, a current load of the internal combustion engine 27 is calculated on the basis of determined air mass flow values and pressure values on the inlet side 1 of the internal combustion engine 27 and a degree of opening of a control valve 17 in front of the combustion chamber 15. By means of the method, both the degree of opening of the blow-off valve flap 24 and also the rotational speed of the turbine 5 and a pressure drop or pressure increase on the compressor 4 can be controlled.

Figure 3:
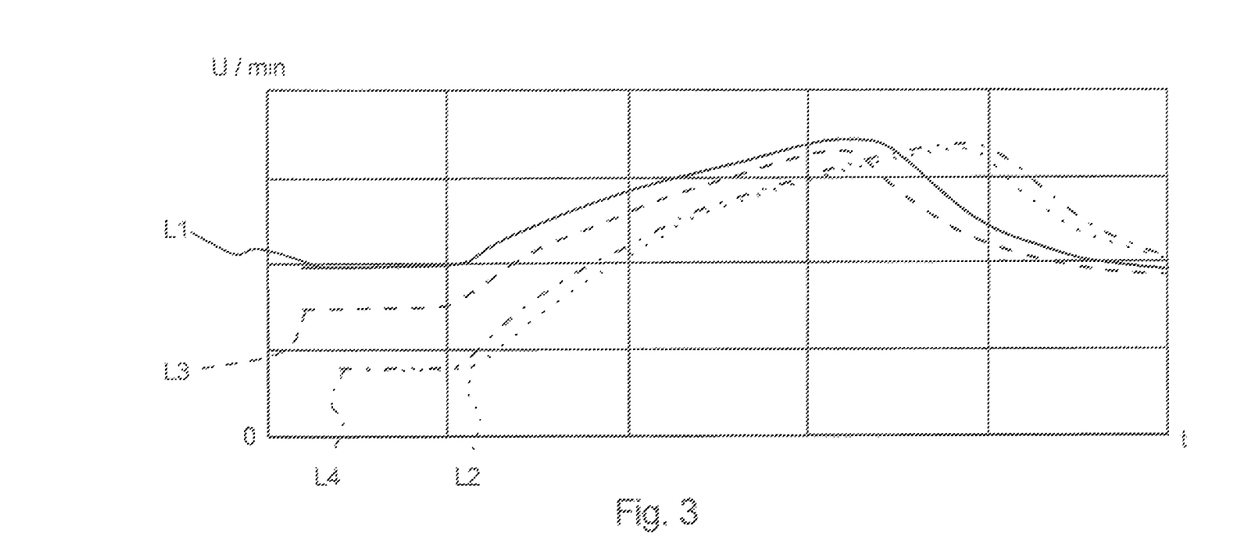
FIG. 3 illustrates an increase of a turbine speed as a function of a degree of opening of the blow-off valve flap.

FIG. 3 exemplarily shows an acceleration of the turbine 5 within a time span following an engine load jump.

Here, the continuous line L1 shows the acceleration of the turbine 5 with closed flap 24 and the dotted line L2 the acceleration of the turbine 5 with completely opened flap 24.

The dashed line 3 shows the acceleration of the turbine 5 with partially opened flap 24 and the dash-dotted line L4 the acceleration of the turbine 5 when the blow-off valve flap 24 is only minimally opened.

Here it is clearly visible that a course of the lines L1, L4 for the closed and partially opened flap 24 and of the lines L2, L3 for the opened and minimally opened flap 24 show relatively minor differences in the acceleration characteristics of the turbine 5 over the time.

Figure 4:
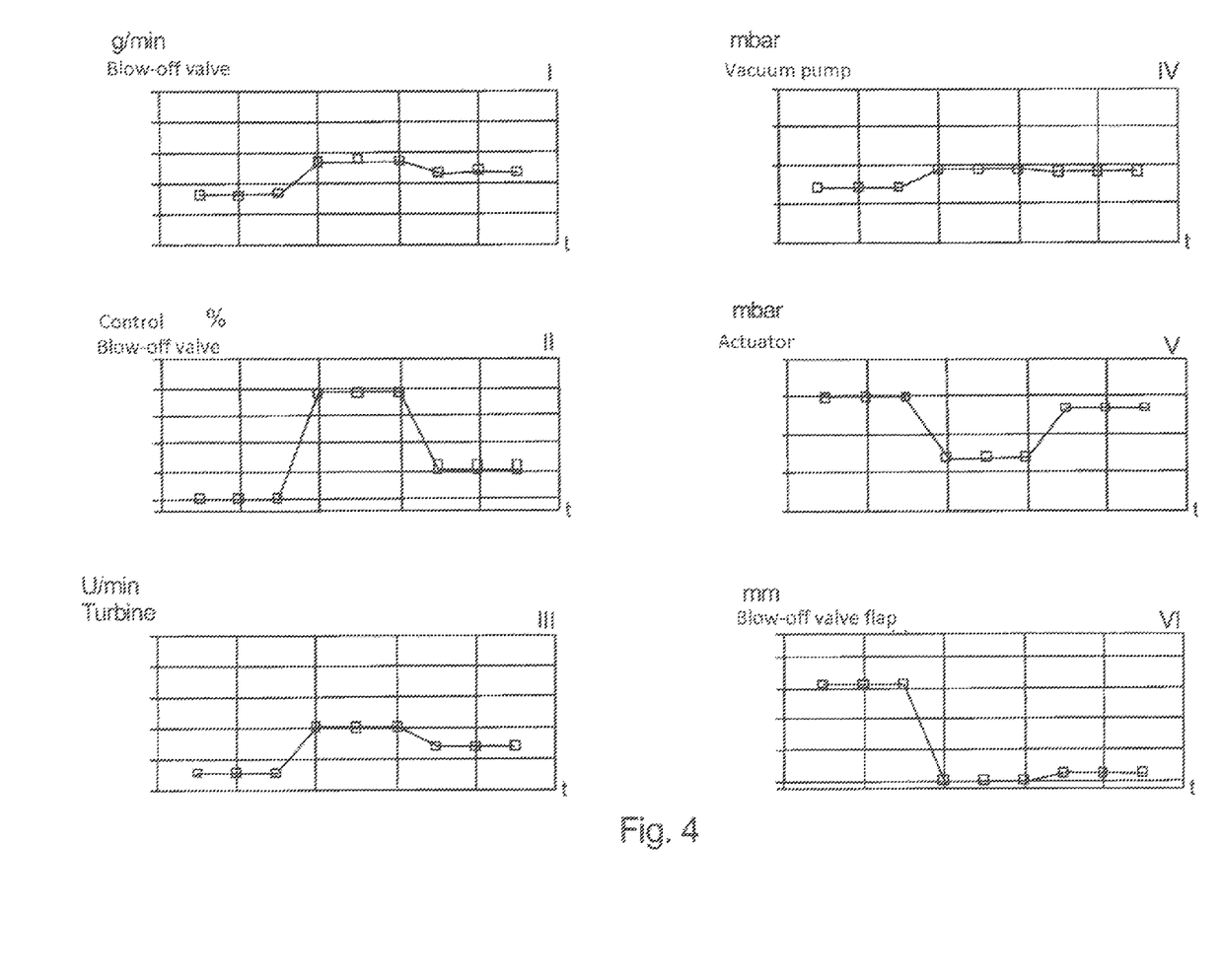
FIG. 4 illustrates air mass flow as a function of an opening of the blow-off valve flap.

In FIG. 4, an air mass flow is exemplarily shown in six diagrams I, II, III, IV, V and VI over a common time period t (1), an automatic control of the blow-off valve flap 24 in percent over the joint time period t (II), the rotational speed of the turbine 5 over the joint time period t (III), the pressure in a vacuum pump at the provision chamber 16 over the joint time period t (IV), the pressure of the blow-off valve actuator 25 over the joint time period t (V) and a blow-off valve flap degree of opening or angle detected by the detector 26 indicated in millimeter (VI).

The diagrams exemplarily show the parameters of a blow-off valve flap control device with a vacuum-controlled blow-off valve actuator 25, a turbine rotational speed of 2,000 rpm and a blow-off valve actuator pressure of 1 bar.

The diagrams show the respective values as a function of three different flap positions (diagram VI). The three flap positions are: in the left third of diagram IV the blow-off valve flap is completely opened, no automatic control takes place (diagram II), automatic control 0%. In the middle third, diagram VI shows a completely closed flap with maximum automatic control. Accordingly, the rotational speed of the turbine (diagram III) and the fuel consumption (see vacuum pump diagram IV) rises to a maximum. The right third of the diagrams shows a partially opened valve flap (6) with medium automatic control, lower turbine rotational speed (III) and lower fuel consumption.

Figure 5A:
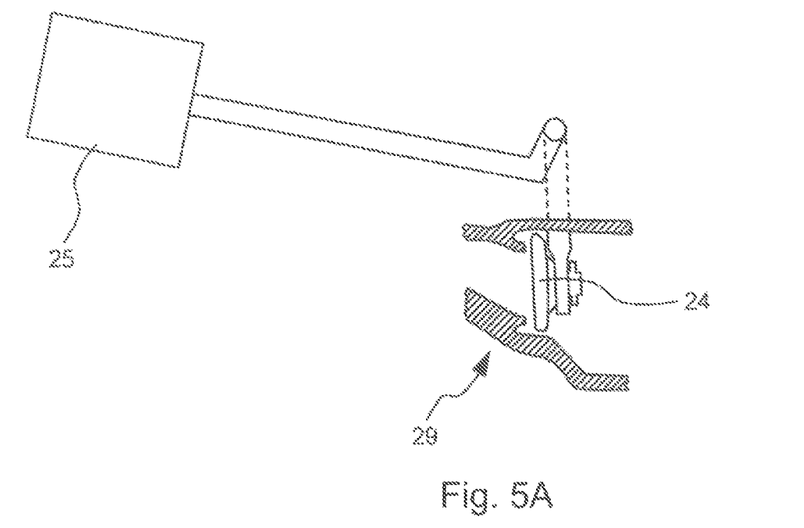
FIGS. 5A and 5B illustrate a minimally and a partially opened flap, respectively.
Figure 5B:
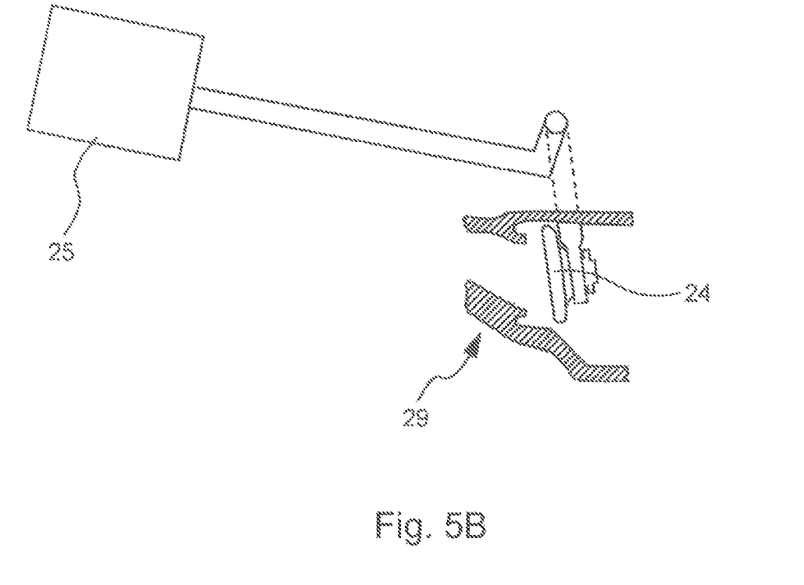

FIGS. 5A and 5B show in two figures opening positions of the blow-off valve flap 24. In the first FIG. 5A, the blow-off valve flap 24 is only minimally opened. This means that the mode selected on the selector knob A can be the normal mode A3, which makes possible a relatively dynamic driving style with moderate fuel consumption improvement.

In FIG. 5B the blow-off valve flap 24 is opened approximately half, as a result of which the dynamic of the internal combustion engine 27 is lower than in the minimally opened position of FIG. 5A, while at the same time the consumption of the internal combustion engine 27 with this flap position is also reduced compared with the consumption of the internal combustion engine 27 with the minimally opened flap position of the FIG. 5A.

Figure 6:
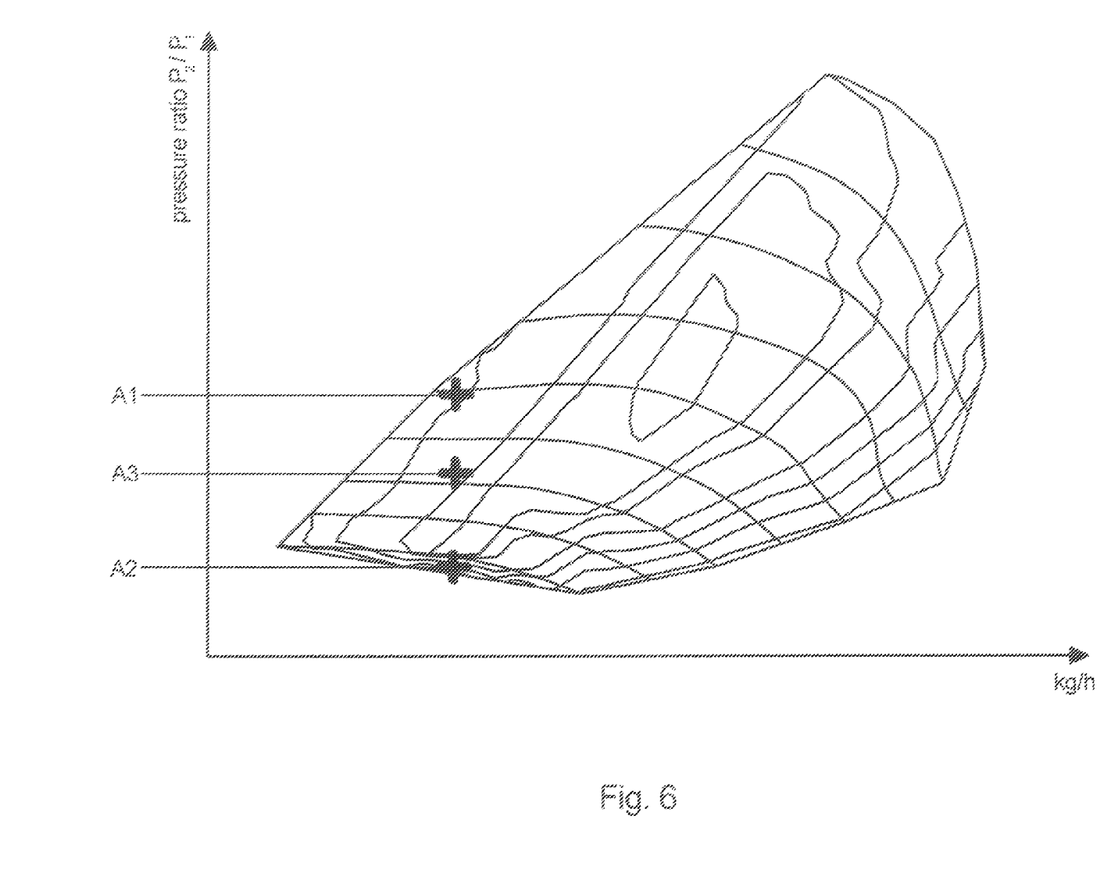
FIG. 6 illustrates pressure conditions with a preset air mass flow and different degrees of opening of the blow-off valve flap.

FIG. 6 shows a diagram, in which for a preset air mass flow (kg/h) and known degrees of opening of the blow-off valve flap 24 the corresponding pressure ratios (P2=pressure downstream of compressor/P1=pressure upstream the compressor) on the compressor 4 are drawn in over a pressure image with lines of constant efficiency and constant rotational speed of a turbocharger.

Starting from the top, the situation of the completely closed flap 24 in sports mode A1 is shown, in which the pressure ratio from the inlet pressure into the compressor 4 to the outlet pressure out of the compressor 5 is very high, which stands for a high rotational speed of the turbocharger 28, since with closed flap 24 the entire air or exhaust gas mass flow coming from the combustion chamber 15 is directed through the turbine 5.

In the middle, the pressure ratio for a minimally (trade-off) opened flap 24 in normal mode A3 is shown. The pressure drop in the turbocharger 28 caused by this is minimal which leads to a reduction of the engine dynamic by a value which is not perceived or at least partly perceived by the driver and additionally lowers the fuel consumption of the internal combustion engine 27.

The lower value represents the pressure ratios with a partially opened position of the blow-off valve flap 24 in the economy mode A2, for example a degree of opening of about 50%. In this operating mode, the internal combustion engine 27 is less dynamic and the fuel consumption is minimized.

Figure 7:
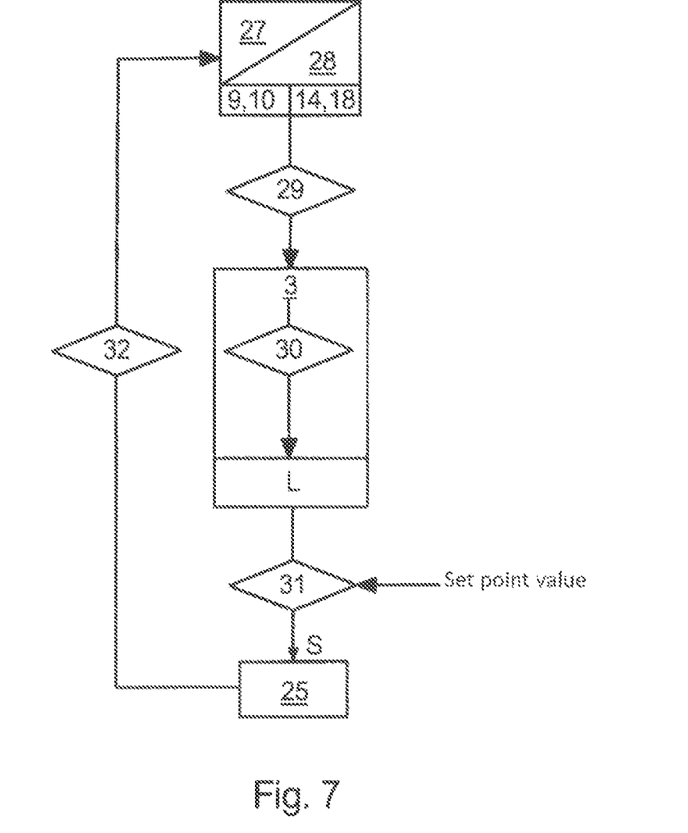
FIG. 7 illustrates an automatic control circuit for controlling a blow-off valve flap position of an internal combustion engine with turbocharger.

FIG. 7 shows an automatic control circuit for controlling a blow-off valve flap position of an internal combustion engine with turbocharger with indication of a method which in this case are shown as number in the circle. With the method for the load-dependent opening and closing of the blow-off valve flap by means of an actuator 25, at least one air pressure value, one air mass flow value and/or an opening position of a valve of a suction pipe are detected by detectors 9, 10, 14, 18 of the internal combustion engine 27 in at 29 and transmitted to a control device 3. At 30, a current load L of the internal combustion engine 27 is determined by the control device 3 from the transmitted values. After this, a control input S for the actuator 25 of the blow-off valve flap (24) is generated at 31 by the control device 3 based on the determined current load L and transmitted to the actuator 25. The control input is designed, by means of the actuator, to completely open, partially open, minimally open or close the blow-off valve flap and to hold it in the respective position (at 32). The operating states and parameters that can be detected by the detectors of internal combustion engine 27 and turbocharger 28 change dependent on the position of the blow-off valve flap.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for load-dependent opening of a blow-off valve flap of an internal combustion engine with a turbocharger, comprising:
   receiving an operation mode, including one of a sport mode, a normal mode and a fuel economy mode from an input device;
   generating, by a control device, a control input for a blow-off valve actuator to move the blow-off valve to a closed position based on the received mode of the sport mode;
   generating, by the control device, the control input for the blow-off valve actuator to move the blow-off valve to a partially open position based on the received mode of the fuel economy mode;
   receiving the normal mode from the input device, and generating, by the control device, the control input for the blow-off valve actuator to move the blow-off valve to a degree of opening based on a current load;
   transmitting the control input to the blow-off valve actuator;
   wherein the step of determining the current load of the internal combustion engine further includes:
   detecting an opening position of a valve upstream of a provision chamber, an air pressure value, and an air mass flow value with at least one detector on an inlet side of the internal combustion engine and calculating the current load based on the opening position of the valve, the air pressure value, and the air mass flow value having been detected;
   wherein in the normal mode, the control input is configured to move the blow-off valve flap to the degree of opening, the degree of opening comprising valve positions which comprises one of completely open, partially open, minimally open and closed.

2. The method according to claim 1, further comprising:
   comparing, by the control device, an actual position of the blow-off valve flap with a set point position of the blow-off valve flap; and
   wherein the step of generating the control input is further based on the comparison in the normal mode.

3. The method according to claim 1, further comprising:
   detecting, by the control device, a change of an air pressure along a compressor; and
   wherein the step of generating the control input is further based on the detection in the normal mode.

4. The method according to claim 1, further comprising:
   detecting, by the control device, a change of a rotational speed of a turbine of the turbocharger; and
   wherein the step of generating the control input is further based on the detection in the normal mode.

5. The method according to claim 1, wherein the detecting comprises detecting the air pressure value, and wherein the blow-off valve flap is controlled to the minimally opened position when the air pressure value of the inlet side is greater than zero and smaller than a preset limit value.

6. The method according to claim 1, wherein the detecting comprises detecting the air pressure value, and wherein the blow-off valve flap is controlled to the partially opened position when the air pressure value on the inlet side is greater than a preset limit value.

7. The method according to claim 1, wherein the detecting comprises detecting the air pressure value, and wherein the blow-off valve flap is closed when the air pressure value on the inlet side is greater than an ambient pressure.

8. A device for checking and at least one of setting and adjusting a degree of opening of a blow-off valve flap, the device comprising:
   an internal combustion engine with a turbocharger;
   a selected mode of operation, the selected mode comprising one of a sport mode, a normal mode and a fuel economy mode;
   a blow-off valve, arranged between an exhaust line of the internal combustion engine and a discharge line of a turbine of the turbocharger, with a blow-off valve actuator for adjusting a degree of opening of the blow-off valve flap;
   a detector that detects the degree of opening of the blow-off valve flap; and
   a control device for adjusting the degree of opening of the blow-off valve flap,
   wherein the control device adjusts the blow-off valve to a closed position based on the selected mode of the sport mode, the control device adjusts the blow-off valve to a partially open position based on the selected mode of the fuel economy mode and the control device determines a position for the blow-off valve in the selected mode of the normal mode based on engine load.

9. The device according to claim 8, wherein in the normal mode the blow-off valve flap is less opened than in the economy mode or in the sports mode.

10. The device according to claim 8, wherein the blow-off valve actuator an electrically or vacuum-controlled actuator.

11. A non-transitory computer program product for load-dependent opening of a blow-off valve flap of an internal combustion engine with a turbocharger, comprising:
   a tangible storage system readable by a processor and storing executable instructions for execution by the processor for performing a method comprising:
   receiving an operation mode, including one of a sport mode, a normal mode and a fuel economy mode;
   generating, by a control device, a control input for a blow-off valve actuator to move the blow-off valve to a closed position based on the received mode of the sport mode;
   generating, by the control device, the control input to move the blow-off valve actuator to a partially open position based on the received mode of the fuel economy mode;
   receiving the normal mode, and generating, by the control device, the control input for the blow-off valve actuator to move the blow-off valve to a degree of opening based on a current load;
   transmitting the control input to the blow-off valve actuator;
   wherein the step of determining the current load of the internal combustion engine further includes:
   detecting an opening position of a valve upstream of a provision chamber, an air pressure value, and an air mass flow value with at least one detector on an inlet side of the internal combustion engine and calculating the current load based on the opening position of the valve, the air pressure value, and the mass flow value having been detected;
   wherein in the normal mode, the control input is configured to move the blow-off valve flap to the degree of opening, the degree of opening comprising valve positions of which comprises one of completely open, partially open, minimally open and closed.

12. The non-transitory computer program product of claim 11, further comprising the executable instructions for:
comparing an actual position of the blow-off valve flap with a set point position of the blow-off valve flap; and
wherein the step of generating the control input is further based on the comparison in the normal mode.

13. The non-transitory computer program product of claim 11, further comprising the executable instructions for:
detecting, by the control device, a change of an air pressure along a compressor; and
wherein the step of generating the control input is further based on the detection in the normal mode.

14. The non-transitory computer program product of claim 11, further comprising the executable instructions for:
detecting, by the control device, a change of a rotational speed of a turbine of the turbocharger; and
wherein the generating the control input is further based on the detection in the normal mode.

* * * * *